C. H. WINDSOR.
UNION.
APPLICATION FILED JUNE 24, 1911.
1,069,916.
Patented Aug. 12, 1913.
2 SHEETS—SHEET 1.
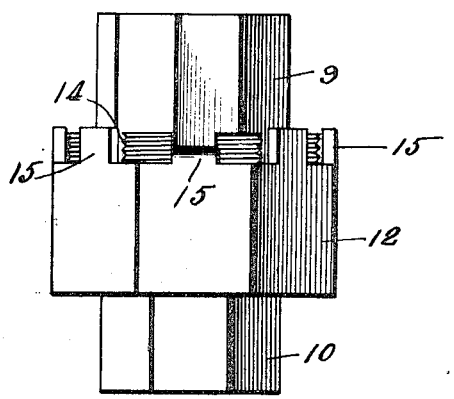
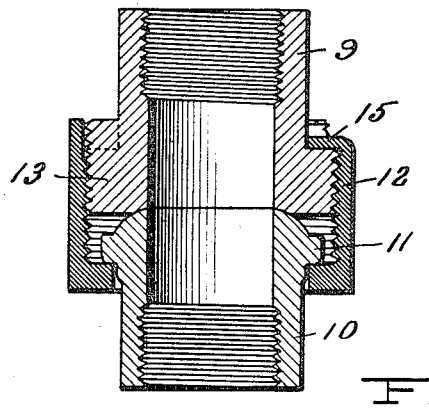
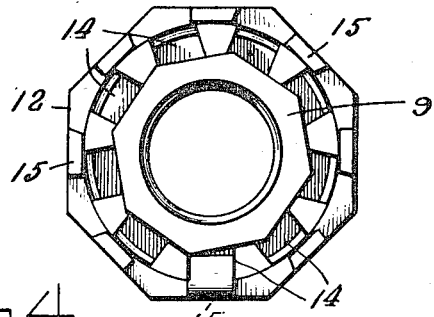
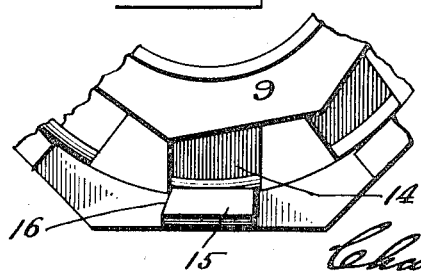
Witnesses
Inventor
Charles H. Windsor
By Myers, Cushman & Rea
Attorney

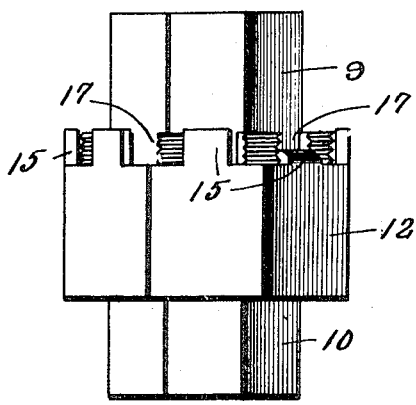
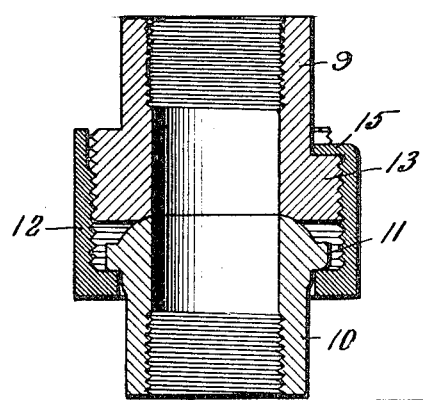
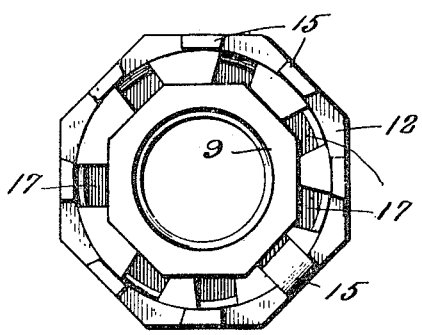
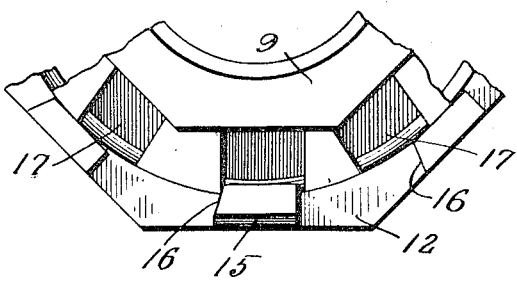

UNITED STATES PATENT OFFICE.

CHARLES H. WINDSOR, OF PALMYRA, NEW JERSEY.

UNION.

1,069,916.

Specification of Letters Patent.  Patented Aug. 12, 1913.

Application filed June 24, 1911. Serial No. 635,221.

*To all whom it may concern:*

Be it known that I, CHARLES HERBERT WINDSOR, a citizen of the United States, residing at Palmyra, in the county of Burlington and State of New Jersey, have invented new and useful Improvements in Unions, of which the following is a specification.

The present invention relates to unions, and, as illustrated in the accompanying disclosure, is shown in connection with pipe unions, which unions comprise, as their essential features, two coupling members, by means of which the ends of the pipes may be brought into intimate contact and so united as to make a tight joint. Obviously, while this type of union is shown to illustrate one embodiment of my disclosure, the invention may be applied to other unions without departing from the spirit thereof.

The invention has for its object to provide a union which may be conveniently and securely locked against displacement, due to creeping of the parts or other causes, and one in which the locking of the parts together may be effected regardless of their relative angular positions.

I accomplish this object by providing the coupling members which, as shown, are of the nut and screw coupling type, with a plurality of locking recesses and lugs, carried, respectively, by the two members and so disposed as that no matter what the angular position of the parts may be, registry of at least one of the lugs with a locking recess will occur.

Referring to the drawings, accompanying this disclosure, Figure 1 is a side view of a pipe union embodying my invention. Fig. 2 is a sectional view on approximately line 2—2 of Fig. 1. Fig. 3 is a plan view, looking downwardly in Fig. 1. Fig. 4 is an enlarged detail view to illustrate the locking lug entering the locking recess. Fig. 5 is a view similar to Fig. 1 showing another embodiment of my invention. Fig. 6 is a vertical sectional view of the coupling shown in Fig. 5. Fig. 7 is a plan view looking from the top of the coupling shown in Fig. 5. Fig. 8 is a detail view to show the locking lug and recesses of the coupling shown in Fig. 7.

Referring to the drawings by numerals, like numbers indicating like parts in the several views, 9 and 10 indicate, respectively, the pipe sections forming the union, one of these sections, in the form shown, being provided with a flange 11 which engages the flange on the coupling nut 12, said coupling nut being threaded interiorly to engage a threaded head or flange 13 on the pipe section 9. The flange or head 13 on the pipe section 9 is provided with a plurality of recesses 14 on its outer surface, as shown, of any suitable width and depth, the rim or upper edge of the nut 12 being provided with a plurality of lugs 15 of substantially the same width as the width of the recesses 14 in the head 13.

It is obvious that in setting up the nut 12 to bring the union together, if the locking recesses and lugs are regularly placed with respect to one another, that some difficulty would be experienced in bringing the lugs and recesses into registry with each other, in order that a locking lug, 15, as shown, may enter a locking recess and hold the nut against displacement. In order to insure registry of a lug with a locking recess somewhere in the circumferential series, at practically any angular position, I have adopted the construction best shown in Fig. 3, in which the recesses 14 and the lugs 15 are unequal in number, this embodiment showing the number of lugs to be one less than the number of recesses, and, as best illustrated in Fig. 3, this arrangement results in an asymmetric relation of the lugs and recesses of the series radially with respect to one other, except, of course, the particular lug and recess which are to be interlocked. By this arrangement it will be observed that the relation of the lugs and recesses is such as to insure registry of at least one lug and recess at very slight angular intervals in the movement of the nut, thus eliminating the necessity of bringing the parts through a wide angle to a fixed or predetermined angular relation before the interlocking may be done. When the lug 15 has been brought opposite a recess in setting up the coupling, the lug will be bent downwardly, the material of which the nut is formed being of malleable or bendable metal, and the parts securely locked against rotation. Preferably one side wall of the lug 15, as at 16, (Fig. 4), will be inclined, this inclined wall being the rear side wall of the lug 15, so that when the lug is brought to the position shown in Fig. 4, and then bent inwardly, the inclined wall 16, riding down the wall of the recess, will tend to continue slightly the rotation of the nut, and insure a tight setting up of the union.

It is obvious that this invention may be worked out in other ways, and in Figs. 5 to 8, inclusive, I have illustrated another embodiment thereof, in which, instead of disposing the recesses 17 in radial symmetry with respect to one another, as in the form just described, they are irregularly arranged and spaced from one another. In this form, it will be observed that by reason of the radial asymmetry of the recesses with respect to one another, a very slight angular movement of the nut will serve to bring one or the other of the locking lugs on the nut into registry with one of the recesses, so that they are, in practice, invariably brought to a position of registry, where the interlocking of the parts may be readily secured. In this form of the invention, the matter of making the lugs and recesses in unequal numbers is immaterial, for the reason that the irregular spacing radially of the recesses provides a coupling which is always sure to be brought, on very slight angular movement of the parts, to a proper position for interlocking.

The coupling may be readily disconnected, if desired, either by turning back the downturned locking lug or by cutting it off, the plurality of lugs and recesses providing ample means for reëngaging the parts in locked position, even if one of the lugs be destroyed in uncoupling.

What I claim is:—

1. A union comprising complementary coupling members, one of which has a plurality of circumferentially arranged locking recesses formed therein; and a plurality of recess-engaging lugs on the other member disposed in radial asymmetry relative to the said recesses.

2. A union comprising complementary coupling members, one of which has a locking recess formed therein; and a recess-engaging lug on the other member, the side wall of one of said locking elements being inclined relative to the proximate side wall of the other locking element.

3. A union comprising complementary coupling members, one of which has a locking recess formed therein; and a recess-engaging lug on the other member having an inclined side wall.

4. A union comprising complementary coupling members, one of which has a plurality of locking recesses formed thereon; and a plurality of bendable recess-engaging lugs on the other member in radial asymmetry relative to said recesses; whereby, on relative angular movement of the union members registry of a recess and lug will result.

5. A union comprising complementary coupling members, one of which has a plurality of locking recesses formed therein; and a plurality of recess-engaging lugs on the other member, one set of said locking elements being arranged in radial asymmetry relative to the other.

6. A union comprising complementary coupling members, one of which has a plurality of locking recesses formed therein, and a plurality of recess-engaging lugs on the other member, the elements of one of said locking members being asymmetrically arranged with respect to one another.

7. A union comprising complementary coupling members, one of which has a plurality of locking recesses arranged asymmetrically with respect to one another, and a plurality of recess-engaging lugs on the other member symmetrically arranged with respect to one another.

In testimony whereof I have hereunto set my hand in presence of two subscribing witnesses.

CHARLES H. WINDSOR.

Witnesses:
ARTHUR L. BRYANT,
A. V. CUSHMAN.